Patented Apr. 10, 1934

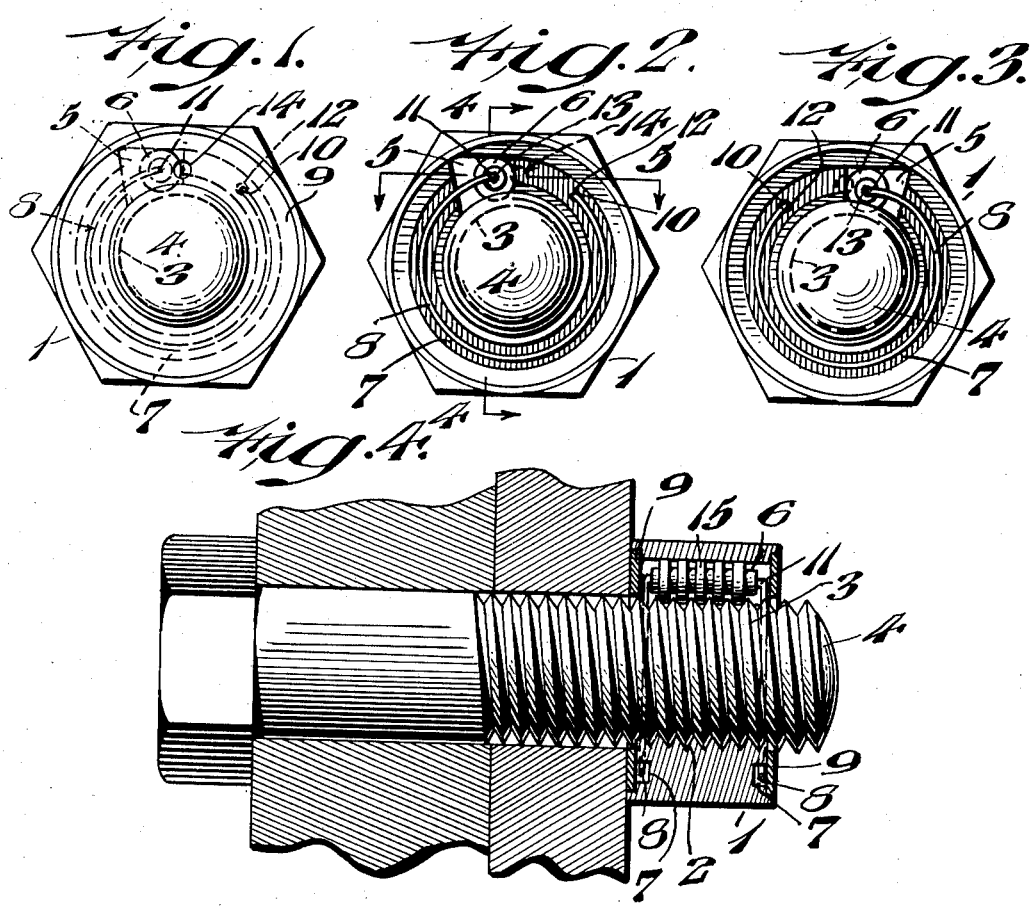

1,954,114

UNITED STATES PATENT OFFICE 1,954,114

LOCK NUT

Karl Gottlob Young and Hermann Veit, Philadelphia, Pa., assignors of one-half to Rudolph Rodgers, Toms River, N. J., and one-half to Daisy Haslett, Mount Holly, N. J.

Application May 2, 1933, Serial No. 668,953

2 Claims. (Cl. 151—25)

Our invention relates to a new and useful lock nut of the general type disclosed in our Patent No. 1,861,202, said nut being of a construction which permits its application to a screw or bolt and which at the same time prevents the nut from being unthreaded or from working loose due to vibrations or other forces to which the nut may be subjected.

Our invention further relates to a lock nut of this character, the construction of which includes means for unthreading the nut at will.

To the above ends, our invention consists of an internally threaded nut provided with a longitudinal opening in the wall thereof and communicating with the threads of said nut, a locking member positioned in said opening, means for tensioning said locking member into its operative locking position with respect to a bolt, or the like, on which the nut is threaded, provision being made for displacement of said locking member from its operative position to permit the threading of the nut.

Our invention further consists of other novel features of construction and advantage, all as hereinafter described and claimed in connection with the accompanying drawing in which:

Fig. 1 represents a plan view of either the top or the bottom face of a lock nut embodying our invention.

Fig. 2 represents a top plan view of the nut shown in Fig. 1, the upper closure member being removed to show internal construction.

Fig. 3 is a view similar to Fig. 2 showing the opposite face of the nut shown in Fig. 1.

Fig. 4 is a fragmentary sectional view, on an enlarged scale, on line 4—4 of Fig. 2.

Fig. 5 is a sectional view on line 5—5 of Fig. 2.

Fig. 6 represents a diagrammatic view illustrating the manner of displacing the locking member from its operative position to permit unthreading of the nut.

Fig. 7 represents a plan view of one form of tensioning member which is employed to maintain the locking element in its operative position to prevent the unthreading of the nut.

Fig. 8 represents a plan view, on an enlarged scale, of one form of the locking member forming part of the construction.

Referring to the drawing in which like reference characters indicate like parts, 1 designates a nut, which may be square, hexagonal, or of any other type, and which is internally threaded as at 2 for engagement with the threads 3 of a bolt or the like 4. In the wall of the nut 1 and communicating with the threads 2 thereof is provided the hole or opening 5 in which is adapted to be seated the locking element 6. The nut 1 is provided on the opposite faces thereof with the grooves or counter-bores 7 in which are adapted to seat the springs 8 and the closure members 9. The springs 8 are provided with the angularly deflected portions 10 and 11 while the nut is provided with the holes 12 which communicate with the grooves or counter-bores 7. The locking member 6 is also provided with the holes 13 and the closure members 9 are provided with the holes 14. In assembling the nut construction shown, the locking member 6 is first positioned in the opening 5 and the deflected ends 10 or 11 of the springs 8 are made to engage the holes 13 at the opposite ends of the locking member 6 while the other deflected ends of the springs 8 are inserted into the opposite holes 12 in the body of the nut 1. By this means, the locking member 6 is yieldably retained in the position shown in Figs. 1, 2 and 3, that is the position in which the locking member 6, whether it be threaded as at 15 or whether it be of a plain round, square, triangular, or other shape, abuts against or engages the threads 3 of the bolt 4 on which the nut is threaded, as shown in Figs. 1 to 5, inclusive. The closure members 9 are then applied to either face of the nut 1 to close the grooves 7, as best seen in Fig. 5, with the holes 14 in the closure members 9 in substantial registration with that part of the opening 5 which is occupied by the locking member 6 when said locking member is maintained in its operative position by the springs 8, as best seen in Fig. 1. The completely assembled nut is then threaded on the bolt 4 and may be turned in a right hand direction only and the nut is prevented from working loose by itself or from being turned by external force in the reverse or unthreading direction by the wedging of the locking member 6 against the threads 3 of the bolt 4. While this wedging action is sufficient to prevent the unthreading of the nut, it is sometimes desirable to thread the locking member 6 as at 15 so that the thread 15 of the locking member 6 will have positive engagement with the threads 3 on the bolt 4, thus making it absolutely impossible to unthread the nut even though the threads on the bolt 4 or the locking member 6 may be stripped, for the reason that the stripping of such threads will produce a wedging action which will further tighten the nut against unthreading. In order to unthread the nut, a pin or other implement 16 is inserted through the hole 14 in either of the closures 9 and the locking member 6 is then displaced from the position illustrated in Figs. 1 to 3, inclusive, that is from the position in which the locking member 6 engages the bolt 4 to the out-of-the-way inoperative position at the other end of the opening 5 wherein the locking member 6 is entirely out of engagement with the bolt 4 and in which position the nut may be unthreaded (see Fig. 6). In order to aid in accomplishing this result, the opening 5 is preferably of a tapered shape and the springs 8 so engage the locking member 6 as to hold it normally in the narrow portion of the opening 5 in which position the locking member 6 projects inwardly towards the bolt 4 to prevent the unthreading of the nut in the manner described, the locking member 6 being pushed by means of the implement 16 into the wider portion of the opening 5 in which position the locking member 6 does not project towards or engage the bolt 4 and hence permits the unthreading of the nut.

While in the drawings we have illustrated a particular form of spring 8, a particular form of closure 9, a particular form of locking member 6, and a particular form of opening 5 in which the locking member 6 is adapted to operate, it is to be understood that the items mentioned can be changed in the details of their construction without departure from the spirit or scope of the invention and that our invention primarily resides in the provision of an opening in the wall of the nut, a suitable locking member adapted to be moved therein from an operative to an inoperative position, together with means for normally tensioning said locking member in its operative position, with provision for displacement of said locking member from its operative to its inoperative position from without, and without the necessity of dismantling or otherwise interfering with the construction of the nut.

Having thus described our invention, what we claim as new and desire to secure by Letters Patent is:

1. A lock nut comprising an internally threaded portion having grooves in the opposite faces thereof and a longitudinal opening in a wall thereof communicating with said grooves and with the threads of said body portion, a roller positioned in said opening, and a pair of circular springs positioned in said grooves, each of said springs having one end thereof anchored in the body portion of said nut and having the other end thereof engaging the juxtaposed end of said roller.

2. A lock nut comprising an internally threaded portion having grooves in the opposite faces thereof and a longitudinal opening in a wall thereof communicating with said grooves and with the threads of said body portion, a roller positioned in said opening, a pair of circular springs positioned in said grooves, each of said springs having one end thereof anchored in the body portion of said nut and having the other end thereof engaging the juxtaposed end of said roller, and closures for said grooves, each of said closures having a hole therein registering with the end of said opening nearest said threads.

HERMANN VEIT.
KARL GOTTLOB YOUNG.